United States Patent [19]

Reynolds et al.

[11] Patent Number: 5,097,930

[45] Date of Patent: Mar. 24, 1992

[54] PRE-ENERGIZER FOR A SYNCHRONIZER

[75] Inventors: Joseph D. Reynolds, Climax; Otis J. Olson, Farmington Hills, both of Mich.

[73] Assignee: Eaton Corporation, Cleveland, Ohio

[21] Appl. No.: 633,704

[22] Filed: Dec. 24, 1990

[51] Int. Cl.⁵ .............................................. F16D 23/06
[52] U.S. Cl. .................................. 192/53 E; 192/53 F; 192/53 G; 74/339
[58] Field of Search ............... 192/53 E, 53 F, 53 G; 74/339

[56] References Cited

U.S. PATENT DOCUMENTS

| | | | |
|---|---|---|---|
| 2,175,911 | 10/1939 | Peterson | 192/53 E |
| 2,410,511 | 11/1946 | Letsinger et al. | 192/53 E |
| 2,896,760 | 7/1959 | Hebbinghaus | 192/53 E |
| 2,941,641 | 6/1960 | Stump | 74/339 X |
| 2,978,083 | 4/1961 | Henyon | 192/114 |
| 3,078,975 | 2/1963 | Eaton | 192/53 E |
| 3,221,851 | 12/1965 | Vandervoort | 192/53 E |
| 3,548,983 | 12/1970 | Hiraiwa | 192/53 E |
| 3,804,218 | 4/1974 | Krutashov | 192/53 E |
| 3,910,390 | 10/1975 | Eichinger | 192/53 F |
| 4,018,319 | 4/1977 | Thomas | 192/53 E |
| 4,125,179 | 11/1978 | Cochran | 192/53 E |
| 4,413,715 | 11/1983 | Michael et al. | 192/53 F |
| 4,425,990 | 1/1984 | Griesser | 192/53 F X |
| 4,428,469 | 1/1984 | Morscheck et al. | 192/53 E |
| 4,462,489 | 7/1984 | Morscheck | 192/53 E |
| 4,478,321 | 10/1984 | De Franco et al. | 192/53 E |
| 4,633,437 | 7/1977 | Labat | 192/53 E X |
| 4,836,348 | 6/1989 | Knödel et al. | 192/53 F |
| 4,869,353 | 9/1989 | Ohtsuki et al. | 192/53 E |
| 4,989,706 | 2/1991 | Morscheck | 192/53 E |

FOREIGN PATENT DOCUMENTS

| | | | |
|---|---|---|---|
| 184077 | 6/1986 | European Pat. Off. | 192/53 E |
| 935768 | 7/1949 | Fed. Rep. of Germany | 192/53 F |
| 1042978 | 11/1958 | Fed. Rep. of Germany | 192/53 F |
| 1049168 | 1/1959 | Fed. Rep. of Germany | 192/53 F |
| 1940107 | 2/1971 | Fed. Rep. of Germany | 192/53 F |
| 2055884 | 5/1972 | Fed. Rep. of Germany | 192/53 F |
| 2753342 | 5/1979 | Fed. Rep. of Germany | 192/53 F |
| 3217950 | 11/1983 | Fed. Rep. of Germany | 192/53 F |
| 1098083 | 7/1955 | France | 192/53 G |
| 562286 | 5/1957 | Italy | 192/53 F |
| 2085984 | 5/1982 | United Kingdom | 192/53 F |
| 2101240 | 1/1983 | United Kingdom | 192/53 F |

*Primary Examiner*—Leslie A. Braun
*Assistant Examiner*—Nicholas Whitelaw
*Attorney, Agent, or Firm*—P. S. Rulon

[57] ABSTRACT

A pin-type, double-acting synchronizer mechanism (22) with friction clutches (24,36 and 26,38), jaw clutch (28,14b and 30,16b) and self-energizing ramps. The ramps act between a shaft (12) and a shift flange (32) which is rotatable relative to the shaft and jaw clutch members 28,30. Flange 32 includes radially inwardly extending teeth (32k) defining self-energizing ramps (32m,32n,32p,32s) which act against ramp (12d,12e,12f,12g) formed in shaft splines (12b). Three circumferentially spaced pins (40) include blocker shoulders (40c,40d), for preventing asynchronous engagement of the jaw clutches and pre-energizer surfaces (40e,40f) which each cooperate with a pre-energizer and neutral centering assembly (42). The angles of the self-energizing ramps may be varied to provide substantially the same synchronizing time for several or all of the ratio gears in a multi-ratio transmission.

16 Claims, 3 Drawing Sheets

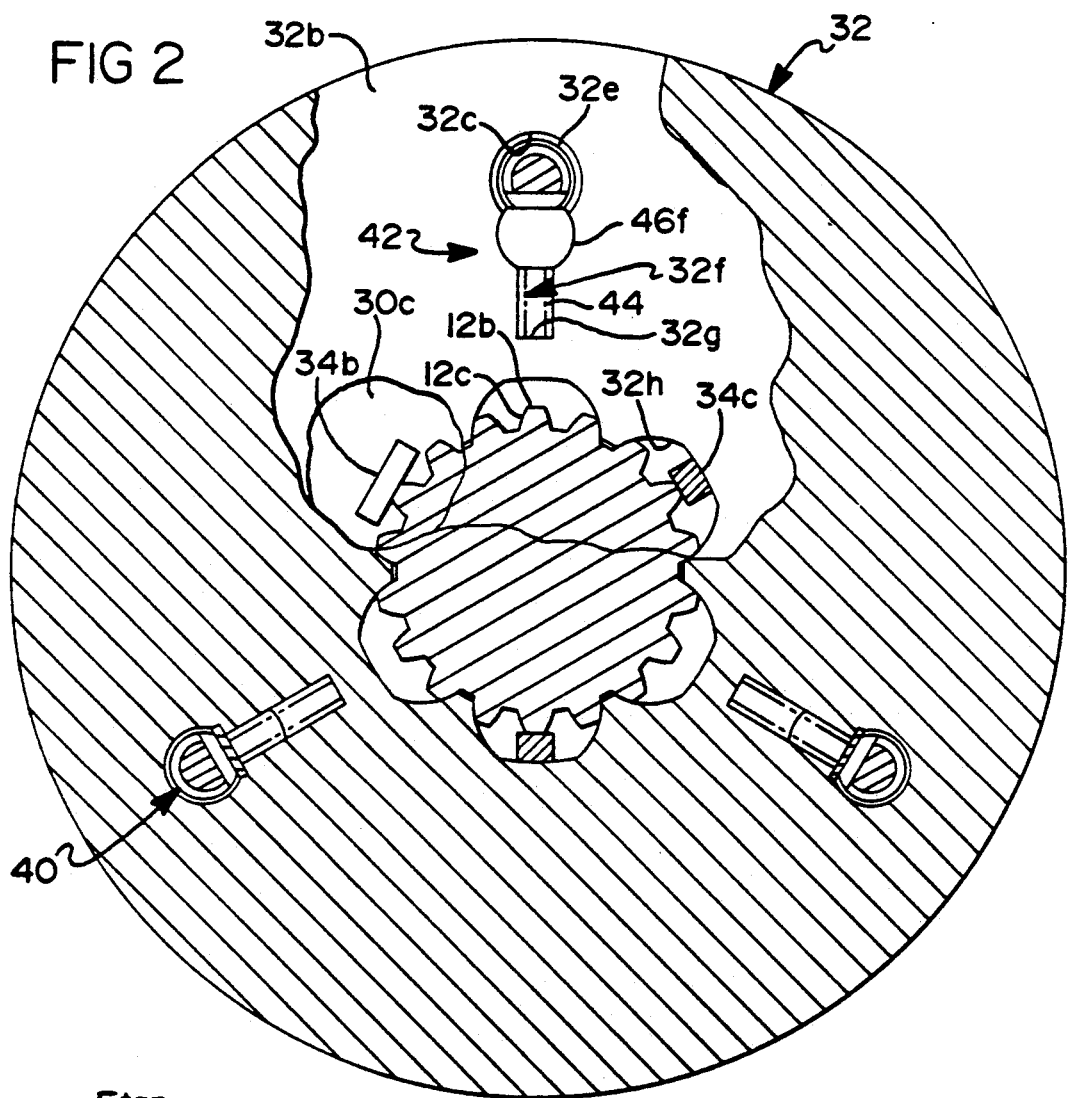
FIG 2
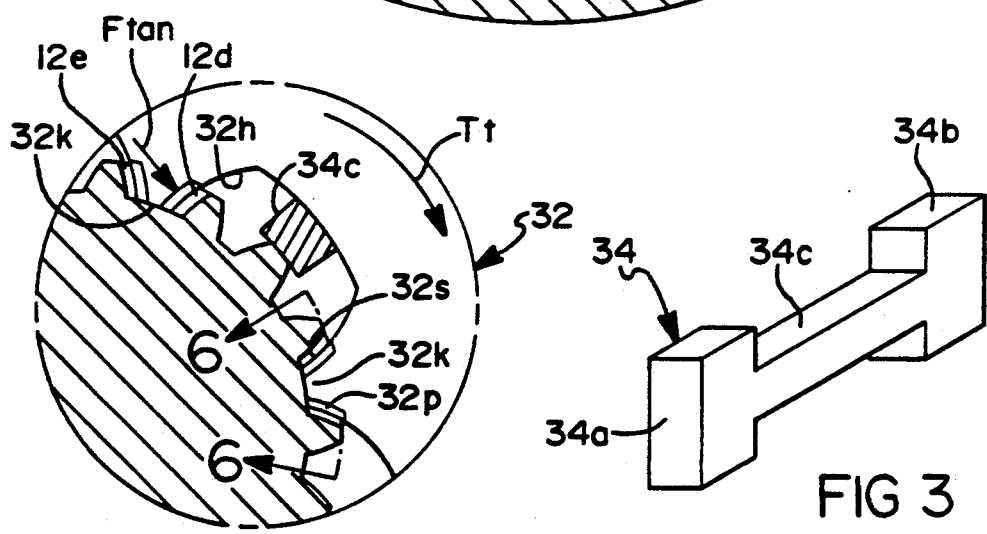
FIG 4
FIG 3

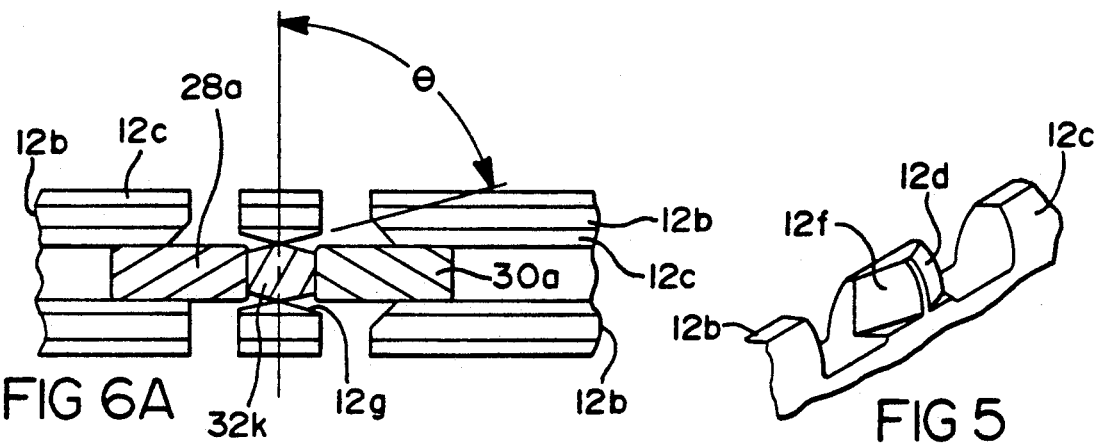
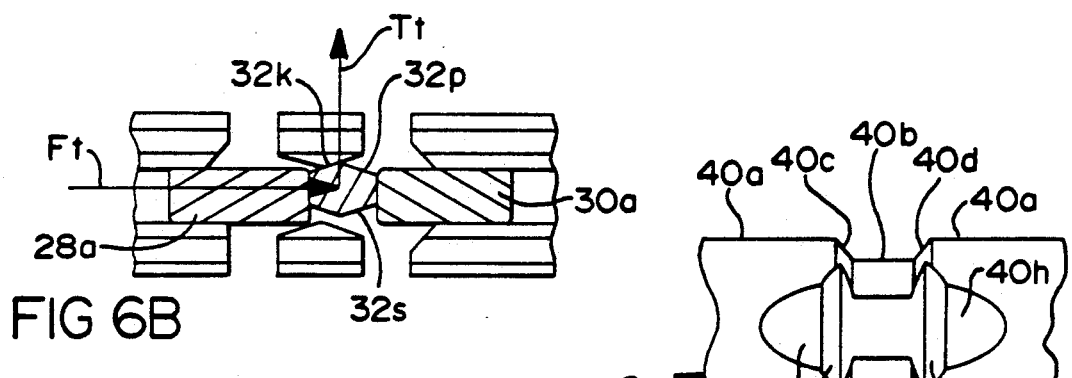
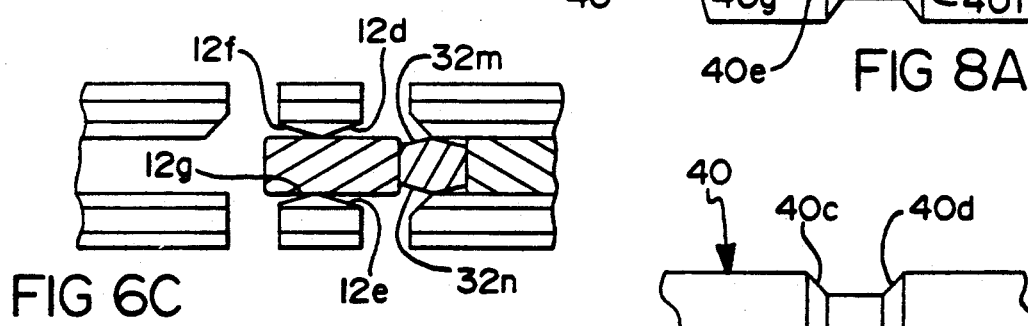
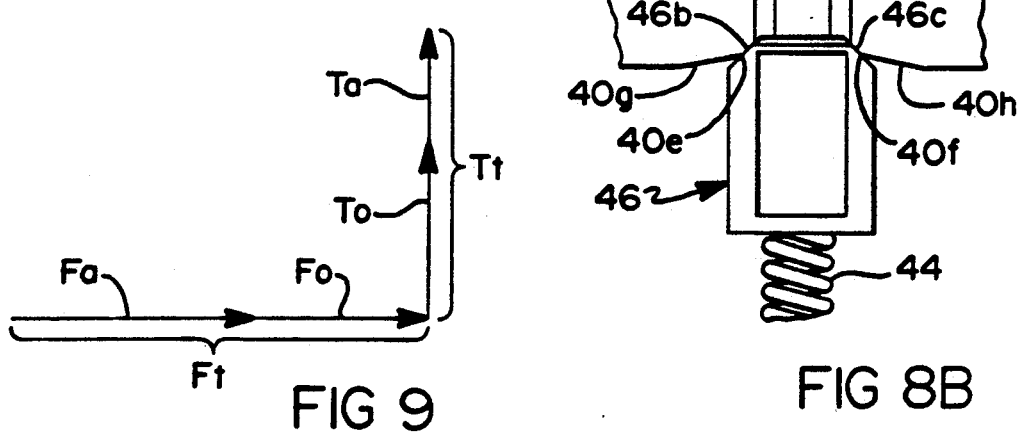

PRE-ENERGIZER FOR A SYNCHRONIZER

CROSS-REFERENCE TO RELATED APPLICATIONS

This application is related to U.S. application Ser. Nos. 632,880, 632,881, 632,882, 632,883, 632,884, 633,703, 633,738, 633,739, 633,743, 633,744, all filed 12-24-90 all assigned to the assignee of this application, and all incorporated herein by reference.

FIELD OF THE INVENTION

This invention relates to a pre-energizer assembly for a synchronizer mechanism employed in a multi-ratio transmission. Additionally, the invention relates to pre-energizer assemblies for synchronizer mechanisms of the self-energizing type.

BACKGROUND OF THE INVENTION

Pin-type synchronizer mechanisms for use in multi-ratio transmissions are well known. Such mechanisms include friction and jaw members for respectively synchronizing and positive clutching a gear to a shaft, a plurality of pins rigidly extending from at least one of the friction and through openings in a radially extending shift flange, pre-energizer assemblies for engaging the friction members in response to initial engaging movement of the flange, blockers defined by shoulders on the pins and about the flange openings for preventing asynchronous engagement of the jaw members. The pre-energizer assemblies for such synchronizer mechanisms have been costly due to the requirement for close manufacturing tolerances and/or have been bulky and/or have been subject to misoperation due in many cases to wear.

It is also well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for heavy duty trucks. Prior art examples of such mechanisms may be seen by reference to U.S. Pat. Nos. 2,410,511; 2,896,760; 3,548,983; 4,413,715; 4,836,348; and 4,869,353 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of and additive to the shift force for further increasing the synchronizing torque of the friction members.

The structure of the synchronizer mechanisms in these patents differs substantially from the structure of pin-type synchronizer mechanisms. Due, at least in part, to these structural differences, it has been difficult to provide pin-type synchronizer mechanisms with the self-energizing feature mentioned above.

Further, while the synchronizer mechanisms of these patents may well have reduced shift time and shift effort, they have not taken into account varying shift requirements for the whole transmission, i.e., lower speed ratio gears in general require more shift effort and/or time than do high gear speed ratios, and that down shifts in general require more effort and/or time than do upshifts.

SUMMARY OF THE INVENTION

An object of this invention is to provide an improved pre-energizer assembly for a pin-type synchronizer mechanism.

Another object of this invention is to provide such an improved pre-energizer assembly for a pin-type synchronizer mechanism with self-energizing means.

According to a feature of the invention a pin-type synchronizing mechanism comprises an annular shift flange extending radially about a shaft having an axis. The flange moves first jaw means and a first friction means respectively into engagement with a second jaw means and second friction means for respectively synchronizing and positive clutching a gear to the shaft. The first friction means includes a rigid ring having a plurality of circumferentially spaced apart pins rigidly extending therefrom and into openings in the flange. Each pin has a reduced diameter portion allowing limited relative rotation between the flange and the pin, and each pin has a blocker shoulder engagable with a blocker shoulder defined about the associated flange opening. Pre-energizer means resiliently engaging the friction means in response to initial axial movement of the flange by a shift force from a neutral position toward the gear, thereby engaging the blocker means in response to engagement of the friction means producing an initial synchronizing torque transmitted to the flange via the pins, and also thereby transmitting the shift force to the first friction means via the blocker shoulders to increase the engaging force of the friction means;

The improvement is characterized by the flange including an elongated slot associated with each flange opening, each slot having a transverse extent extending axially through axially facing end faces of the flange and an elongated extent with one end of the elongated extent extending into the associated flange opening and the other end being a reaction surface;

resilient means disposed in each slot with one end reacting against the reaction surface and another end reacting against a plunger;

each plunger having a head portion received by the reduced diameter portion of the pin disposed in the associated opening with the flange is in the neutral position, each plunger having axially spaced sidewalls slidably embracing the end faces of the flange for retaining the plunger relative to the axial direction of the flange.

BRIEF DESCRIPTION OF THE DRAWINGS

The synchronizer mechanism of the invention is shown in the accompanying drawings in which:

FIG. 2 is a partially sectioned view looking along line 2—2 of FIG. 1;

FIG. 3 is a perspective view of a component in FIGS. 1 and 2;

FIG. 4 is a partial view of a toothed portion in the synchronizer of FIGS. 1 and 2;

FIG. 5 is a perspective view of a portion of a tooth in FIG. 4;

FIG. 6A is a sectional view of portions of the teeth looking along curved line 6A—6A of FIG. 4 with FIGS. 6B and 6C illustrating the teeth in different positions;

FIGS. 8A and 8B are detailed views of a pin component in FIGS. 1 and 2; and

FIG. 9 is a graphical representation of axial force and torque acting on a shift flange of the synchronizer.

DETAILED DESCRIPTION OF THE DRAWINGS

Figure 1:
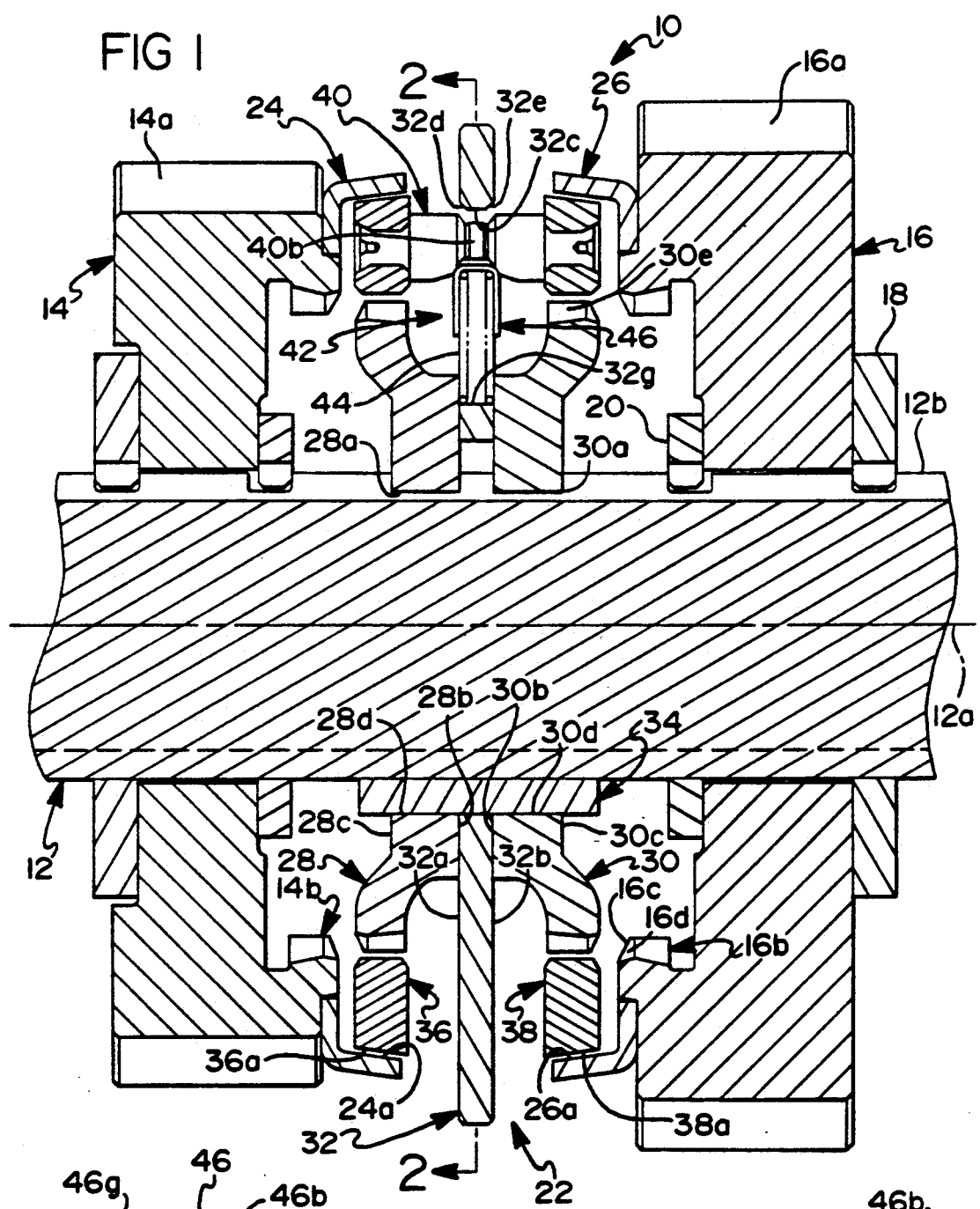
FIG. 1 is a sectional view of a double-acting synchronizer looking along line 1—1 of FIG. 2.

Looking first mainly at FIGS. 1 and 2, therein is shown a gear and synchronizer assembly 10 for an otherwise unshown transmission of the type intended for use in a land vehicle, particularly of the type used in heavy duty trucks. However, assembly 10 may be used in other applications. The assembly includes a shaft 12 mounted for rotation about a central axis 12a in unshown manner, spaced apart ratio gears 14,16 rotatably supported on the shaft and secured against axial movement relative to the shaft by annular thrust members 18,20 affixed to the shaft in known manner, and a double-acting pin-type synchronizer clutch mechanism 22. When assembly 10 is part of a twin countershaft transmission, such as disclosed in U.S. Pat. Nos. 3,648,546 and 4,788,889, which patents are incorporated herein by reference, teeth 14a,16a on the gears will be in constant mesh with engine driven gears on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into.

The synchronizer mechanism 22 includes annular friction members 24,26 and annular jaw clutch members 14b,16b affixed to gears 14,16, jaw clutch members 28,30, having internal spline teeth 28a,30a slidably mating with external spline teeth 12b integrally formed with the shaft or otherwise affixed thereto, a radially extending shift flange 32, having axially oppositely facing sides sandwiched between axially facing surfaces 28b,30b of the jaw members 28,30, three H-shaped retainer members 34 (one of which is shown in perspective in FIG. 3) for securing the flange and jaw members against relative axial movement, annular friction members or rings 36,38 rigidly secured together by three circumferentially spaced apart pins 40 extending axially from each of the friction members and through openings 32c in the flange, and three pre-energizer and neutral centering assemblies 42 each including a spring 44 and a plunger 46 which reacts with surfaces defined by the pins. Alternatively, synchronizer mechanism 22 may be of the single-acting pin-type, i.e., configured to synchronize and jaw clutch only one gear to a shaft; such a mechanism is disclosed in U.S. Pat. No. 3,221,851 which is incorporated herein by reference. Also, the number of retainers 34, pins 40 and assemblies 42 may be more or less than disclosed herein.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or, as is known in the art, they may be formed integral with the gears. Friction members 24,26 have internal cone friction surfaces 24a,26a which respectively mate with external cone friction surfaces 36a,38a. Members 24,26 and 36,38 also are respectively referred to as synchronizer cups and rings.

A wide range of cone angles may be used; herein, cone angles of seven and one-half degrees are employed. The friction surfaces 36a,38a and/or 24a,26a may be defined by any of several known friction materials affixed to the base member; herein, a pyrolytic carbon friction material, such as disclosed in U.S. Pat. Nos. 4,700,823; 4,844,218; and 4,778,548, are preferred. These patents are incorporated herein by reference.

Pins 40 are shown in greater detail in FIG. 8A and in FIG. 8B in combination with the pre-energizer spring and plunger. Each pin includes major diameter portions 40a having diameters slightly less than the diameter of flange openings 32c, a reduced diameter or groove portion 40b spaced between friction rings 36,38 (herein midway), conical blocker shoulders or surfaces 40c,40d extending radially outward from the pin axis and axially away from each other at angles herein of about forty degrees relative to a line normal to the pin axis, and preferably, but not necessarily, independent pre-energizer surfaces 40e,40f and extended secondary centering surfaces 40g,40h. The grooved portions, when disposed within their respective flange openings, allow limited rotation of the rigid friction ring and pin assembly relative to the flange to effect engagement of the pin blocker shoulders with chambered blocker shoulders 32d,32e defined about the flange openings. The pre-energizer surfaces 40e,40f chordally intersect or remove a portion of conical blocker shoulders 40c,40d, are preferably (but not necessarily) flat planar surfaces and form angles relative to the pin axis which are somewhat less than the angles of the blocker surfaces. Centering surfaces 40g,40h are also flat planar surfaces and, as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Axial forces provided by the secondary centering surfaces should be sufficient to return flange 32 to its neutral position in the event that such positioning has not been completely effected by the shift mechanism for moving the flange.

Figure 7A:
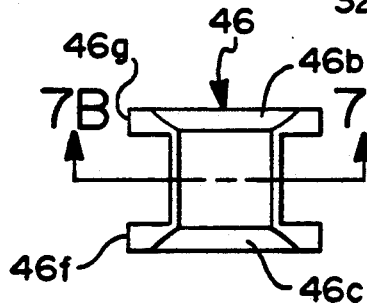
FIGS. 7A, 7B and 7C are detailed views of a plunger component in FIGS. 1 and 2.
Figure 7B:
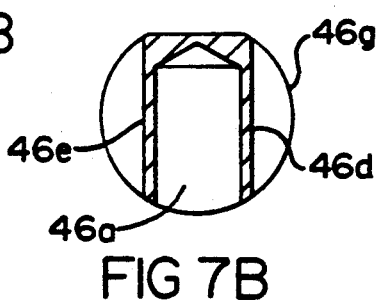
Figure 7C:
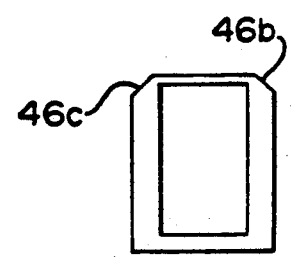

Plungers 46 are biased radially outward toward the pin pre-energizer and centering surfaces by helical compression springs 44 disposed in slots 32f of the flange. The major extents of the slots preferably, but not necessarily, extend radially relative to the shaft axis. The slots also extend axially through the flange sides 32a,32b, into flange openings 32c, and have ends 32g at their radially inward extent for the springs to react against. Flange side 32b is partially shown in the sectioned view of FIG. 2. The radially inner portion of the springs may be retained by unshown means such as pegs extending radially outward from the slot ends. Plungers 46, which are shown in detail in FIGS. 7A, 7B, 7C, may be formed of a sheet metal material, but are preferably formed of a cast or compacted material such as steel to provide structural rigidly and surface hardness. Each plunger includes a blind bore 46a receiving one end of the associated spring, and a head portion defining flat angled surfaces 46b,46c which cooperate with the flat pre-energizer and centering surfaces of the associated pin. The bore is bounded on its sides by sidewalls 46d,46e which slidably cooperate with the slot walls and by sidewalls 46f,46g which slidably embrace flange sidewalls 32a,32b. Sidewalls 46f,46g have a circular shape (FIG. 7B) of diameter less than flange openings 32c to facilitate assembly into the slots via the flange openings.

As previously mentioned, jaw members 28,30 include internal spline teeth 28a,30a slidably mating with external spline teeth 12b affixed to the shaft. The external splines have involute flank surfaces 12c extending parallel to the shaft axis and the mating thereof with flank surfaces of the jaw member splines prevents relative rotation therebetween. H-shaped members 34 each include end portions 34a,34b, which react against jaw member surfaces 28c,30c, and a center portion 34c which interconnects the end portions. Jaw member surface 30c is partially shown in FIG. 2 with end portion 34b thereon. The center portion extends snugly through axially extending slots 28d,30d in the jaw members and freely through scallop-like openings 32h which allow rotational movement of the flange relative to the jaw members and shaft for reasons explained hereinafter.

As best seen in FIGS. 4, 6A, 6B, 6C, portions of shaft teeth flanks 12c, in both axial directions from the FIGS. 1 and 6A neutral position of flange 32, are modified to provide one or more ramp surfaces which cooperate with a like number of ramp surfaces defined by internal teeth 32k extending radially inward from flange 32 and into the axially extending spaces between shaft splines 12b. The ramp surfaces allow limited rotation of the flange relative to jaw members 28,30 and shaft 12, and react synchronizing torque from the cone clutches to provide an additive axial self-energizing force for increasing the engaging force of the cone clutch initially engaged by a shift force applied to flange 32, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically and by way of example only, the modified portions of teeth 12b have ramp surfaces 12d,12e which respectively react against ramp surfaces 32m,32n on flange teeth 32k to provide the additive axial force to increase or assist the synchronization rate of gear 16 in response to torque in either direction. Further, teeth 12b have ramp surfaces 12f,12g which react against ramp surfaces 32p,32q to provide the additive axial force for gear 16 in response to torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. For example purposes only, ramps 12g and 32g could be parallel to the spline to provide no additive axial force in response to synchronizing torque.

When the flange 32 is in the neutral position of FIGS. 1 and 6A, reduced diameter portions 40b of pins 40 are radially aligned with their associated flange openings 32c, friction surfaces of the cone clutches are slightly spaced apart and are maintained in this spaced relation by angled pre-energizer surfaces 46b,46c of the plungers 46 acting on pre-energizer surfaces 40e,40f of pins 40 by the force of springs 44. The axial force provided by the pre-energizer surface is preferably sufficient to counter act any additive axial force on flange by the self-energizing ramps due to viscous shear of oil between the cone clutch surfaces. When it is desired to couple either gear to the shaft, an appropriate and unshown shift mechanism, such as disclosed in U.S. Pat. No. 4,920,815 incorporated herein by reference and connected to the outer periphery of flange 32 in known manner, moves the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by the length of arrow $F_o$ in FIG. 9.

Initial axial movement of flange 32 by the operator shift force $F_o$ is transmitted to the pins by pre-energizer surfaces 40f,46c to effect initial frictional engagement of cone surface 38a with cone surface 26a. The initial engagement force of the cone surface is of course a function of the force of springs 44 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 32 and the engaged friction ring, and hence, movement of the reduced diameter pin portions 40b to the appropriate sides of the flange openings 32c to provide engagement of pin blocker shoulders 40c with flange blocker shoulders 32d. When the blocker shoulders are engaged, the full operator shift force $F_o$ on flange 32 is transmitted to friction ring 38 via the blocker shoulders, whereby the cone clutch is engaged by the full force of the operator shift force $F_o$ and to provide a resultant operator synchronizing torque $T_o$. This operator synchronizing torque $T_o$ is represented by arrow $T_o$ in FIG. 9. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32c to allow continued axial movement of the flange and engagement of the external jaw teeth 30e of jaw member 30 with internal jaw teeth 16c of jaw member 16b. As is known in the prior art and as is specified by reference numbers only for jaw member 16b, the lead portions of the jaw teeth have rake leading edges 16c to reduce tooth damage during initial contact, and have chamfer or wedge faces 16d to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. Accordingly, the jaw teeth are preferably disposed about as large a diameter as is practicable.

Still ignoring the effects of the self-energizing ramps, cone clutch torque provided by the force $F_o$ is expressed by equation (1).

$$T_o = F_o R_c \mu_c / \sin \alpha \tag{1}$$

where:
$R_c$ = the mean radius of the cone friction surface,
$\mu_c$ = the coefficient of friction of the cone friction surface, and
$\alpha$ = the angle of the cone friction surfaces, herein 7.5 degrees.

Looking now at the affects of the self-energizing ramps and referring particularly to FIGS. 6, the synchronizing torque $T_o$, due to the operator applied axial shift force $F_o$, is of course transmitted to flange 32 by pins 40 and is reacted to shaft 12 across the self-energizing ramp surfaces. The self-energizing ramp surfaces limit rotation of the flange relative to shaft 12 and jaw members 28,30, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 6A illustrates the position of the self-energizing ramp surfaces and the position of the jaw member splines 28a,30a to the shaft splines 12b while shift flange 32 is in the neutral position corresponding to the position of FIG. 1. FIG. 6B illustrates a position of the ramps and splines while gear 16 is being synchronized by engaged cone surfaces 26a,38a. The engaged cone surfaces are producing a synchronizing torque in a direction which has effected engagement of flange member ramp surfaces 32m with shaft ramp surfaces 12d. Hence, the sum of the axial forces for engaging the cone clutch are $F_o$ plus $F_a$ and the sum of the synchronizing torques being produced by the cone clutch are $T_o$ plus $T_a$, as graphically shown in FIG. 9. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward lockup. Self-locking rather than self-energizing decreases shift quality or feel, may over stress synchronizer components, may cause over heating and rapid wear of the cone clutch surfaces, and may even override operator movement of the shift lever.

The main variables for calculating self-energizing ramp angles $\theta$ and for providing additive axial forces $F_a$, which increase and decrease in proportion to operator forces $F_o$, are cone clutch angle $\alpha$, cone clutch coefficient of friction $\mu_c$, mean radii ratio $R_c$ of the cone clutch and $R_r$ of the self-energizing ramps, ramp coefficient of friction $\mu_r$, and pressure angle $\phi$ of the self-energizing ramps. The pressure angle $\phi$ may be zero. Herein, the ramps have an involute profile, as may be seen in FIG. 5, and have a pressure angle of 20 degrees.

The total synchronizing torque $T_t$ produced by the cone clutch is:

$$T_t = F_t R_c \mu_c / \sin \alpha \tag{2}$$

where $$T_t = T_o + T_a \tag{3}$$

and $$F_t = F_o + F_a \tag{4}$$

The equation for the axial additive force $F_a$, which is given without derivation, is $$F_a = F_{tan} \left[ \frac{\cos\theta - \mu_r \sin\theta/\cos\phi}{\sin\theta + \mu_r \cos\theta/\cos\phi} \right] \tag{5}$$

where the ramp angle $\theta$ is measured from a plane normal to shaft axis 12a, and $F_{tan}$ acts on the ramp and is the tangential force component of torque $T_t$ at $R_r$. $T_t$ and $F_{tan}$ for one torque direction are respectfully represented by like referenced arrows in FIG. 4. Therefore, $$F_{tan} = T_t / R_r \tag{6}$$

Substituting equations (5) and (6) into equation (4) and solving for $F_t$ gives $$F_t = \frac{F_o}{1 - \left[ \frac{\cos\theta - \mu_r \sin\theta/\cos\phi}{\sin\theta + \mu_r \cos\theta/\cos\phi} \right] \left[ \frac{R_c \mu_c}{R_r \sin\alpha} \right]} \tag{7}$$

$F_t/F_o$ is defined as a boost or self-energizing ratio. The greater the boost ratio the greater the total synchronizer $T_t$ for a given operator force $F_o$. Boost ratios equal to one correspond to ramp angles $\theta$ of 90 degrees; such angles are parallel to the shaft splines and provide no self-energizing. As $\theta$ decreases, the boost ratio increases. Boost ratios from 1:1 to about 5:1 have been employed. However, boost ratios greater than 1:1 and less than 5:1 are preferred. $F_t/F_o$ tends to infinity as the denominator of equation (7) tends to zero. This of course occurs when the minus term in the denominator of equation (7) approaches one. Accordingly, the ramps are self-energizing and not self-locking when $$\left[ \frac{\cos\theta - \mu_r \sin\theta/\cos\phi}{\sin\theta + \mu_r \cos\theta/\cos\phi} \right] \left[ \frac{R_c \mu_c}{R_r \sin\alpha} \right] < 1 \tag{8}$$

For a given synchronizer geometry, equation (8) may be simplified by setting $R_c$, $\mu_c$, $R_r$, $\alpha$ equal to a constant K:

$$\frac{R_c \mu_c}{R_r \sin\alpha} = \frac{1}{K} \quad (9A)$$

OR $$\frac{R_r \sin\alpha}{R_c \mu_c} = K \quad (9B)$$

Substituting either of equations (9) into equation (8), re-arranging and solving for ramp angles $\theta$ gives equation (10) which provides minimum angles $\theta$. Such minimum angles produce self-energizing forces $F_a$ which are proportional to operator forces $F_o$, which provide maximum controllable boost ratios, and which are not self-locking.

$$\theta > \text{TAN}^{-1} \left[ \frac{1 - K\mu_r/\cos\phi}{K + \mu_r/\cos\phi} \right] \quad (10)$$

Keeping in mind that $\theta$ is measured from a plane normal to shaft axis 12b, increasing values of angles $\theta$ therefore provide decreasing values of forces $F_a$ and torque $T_a$, and of course decreasing values of torque $T_t$. Accordingly, as K increases, angles $\theta$ must decrease to prevent self-locking and to keep forces $F_a$ proportional to $F_o$, provided all other variables remain the same.

More specifically, to prevent self-locking and to keep forces $F_a$ proportional to $F_o$, minimum angles $\theta$ should increase:

as the ratio $R_c/R_r$ increases and/or,
as the cone angle $\alpha$ decreases and/or,
as the coefficient of clutch friction $\mu_c$ increases and/or,
as the ramp pressure angle $\phi$ increases and/or,
as the coefficient of ramp friction $\mu_r$ increases.

Also, when calculating minimum ramp angles for a so-called given geometry and a maximum desired boost ratio, a margin of safety is preferred to prevent self-locking or over boost due to manufacturing tolerances and due to normal wear of components.

Looking now at applications of synchronizer mechanisms 10 in a multi-ratio speed change transmission, as is known, the time required to synchronize a ratio gear decreases as the total synchronizing torque increases. Further, due to differences in reflected inertia, i.e., actual inertia of components being synchronized plus friction, the amount of work required to synchronize lower speed ratio gears is in general greater than that required for higher speed ratio gears; also, the amount of work required to synchronize a given ratio gear for downshifts is in general greater than that required for upshifts. Accordingly, when the synchronizer mechanisms disclosed herein are employed in a multi-ratio transmission, the mechanisms for lower speed ratio gears are preferably provided with higher boost ratios and the mechanisms for higher speed ratios are preferably provided with lower boost ratios. Also, for a given ratio gear, the boost ratio for downshifts is preferably greater than for upshifts. By so arranging the boost ratios, substantially equal shift or synchronizing times can be provided for all ratio gears of a transmission provided with the self-energizing synchronizer mechanisms. For the synchronizer mechanisms disclosed herein, the boost ratios are readily varied by varying the cone clutch angles $\alpha$, the radii ratio $R_c/R_r$, and the self-energizing ramp angles $\theta$.

As may be readily seen by reference to the drawings herein, flange 32 is disconnected from the torque path between shaft 12 and either of the ratio gears 14,16 when either of the jaw members 28,30 are engaged with jaw members of the associated gear. Accordingly, the relatively small and wear sensitive self-energizing ramps are never exposed to the deteriorating effects of the full torque loads of the ratio gears. This is particularly important as the self-energizing ramps are moved radially inward since the forces acting on the ramps increases with decreasing ramp radius relative to shaft axis 12a.

Further, due to radius differences, forces acting between jaw member splines 28a,30a and shaft splines 12b are greater than the forces acting between the jaw clutch teeth. Accordingly, the axial length of the spline connection between jaw member splines 28a,30a and shaft splines 12b are preferably greater than what is necessary for adequate strength for the jaw clutch teeth. This greater axial spline length connection is inherent in the disclosed embodiment without lengthening the stroke of the shift mechanism which moves flange 32 since flange 32 is not circumferentially fixed to jaw clutch members 28,30 or shaft 12; hence jaw member splines 28a,30a may continuously mate with shaft splines 12b. This is particularly important when a vehicle operator moves the shift mechanism via a manually operated shift lever in known manner. An example of such lever may be seen by reference to U.S. Pat. No. 3,850,047 which is incorporated herein by reference. Such levers are commonly of the first class lever type wherein increased shift stroke requires either increased operator movement of the shift lever or (by change the lever fulcrum) decreased force applied to the shift mechanism for a given operator shift effort.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizing mechanism comprising an annular shift flange extending radially about a shaft having an axis, the flange for moving first jaw and first friction means respectively into engagement with second jaw and second friction means for respectively synchronizing and positive clutching a gear to the shaft, the first friction means including a rigid ring having a plurality of circumferentially spaced apart pins rigidly extending therefrom and into openings in the flange, each pin having a reduced diameter portion allowing limited relative rotation between the flange and the pin, and each pin having a blocker shoulder surface engagable with a blocker shoulder defined about the associated flange opening; pre-energizer means for resiliently engaging the friction means in response to initial axial movement of the flange by a shift force ($F_o$) from a neutral position toward the gear, for engaging the blocker shoulder surfaces in response to engagement of the friction means producing an initial synchronizing torque transmitted to the flange via the pins and for transmitting the shift force ($F_o$) to the first friction means via the blocker shoulder surfaces to increase the engaging force of the friction means; characterized by:

the flange including an elongated slot associated with each flange opening, each slot having a transverse extent extending axially through axially facing end faces of the flange and an elongated extent with one end of the elongated extent extending into the associated flange opening and the other end being a reaction surface;

resilient means disposed in each slot with one end reacting against the reaction surface and another end reacting against a plunger; and each plunger having a head portion received by the reduced diameter portion of the pin disposed in the associated opening with the flange in the neutral position, each plunger having axially spaced sidewalls slidably embracing the end faces of the flange for retaining the plunger relative to the axial direction of the flange.

2. The synchronizer mechanism of claim 1, wherein:
each pin includes an axis parallel to the shaft axis, the blocker shoulder surface extending radially outward from the reduced diameter portion and axially toward the rigid ring at a predetermined angle relative to the pin axis, each pin also including a pre-energizer surface reacting against the plunger head portion, the pre-energizer surface extending radially outward and axially toward the rigid ring at a lesser angle relative to the pin axis than the blocker shoulder surface angle.

3. The synchronizer mechanism of claim 2, wherein:
each pin includes a secondary centering surface extending radially outward and axially away from a radially outer edge of each pre-energizer surface and at a lesser angle relative to the pin axis than the pre-energizer surface.

4. The synchronizer mechanism of claim 2, wherein:
the blocker shoulder surfaces are substantially conical surfaces and the pre-energizer surfaces are substantially flat planar surfaces.

5. The synchronizer mechanism of claim 4, wherein:
the flat planar surface extends chordally across a portion of each conical surface.

6. The synchronizer mechanism of claim 5, wherein:
each pin includes a secondary centering surface extending radially outward and axially away from a radially outer edge of each pre-energizer surface and at a lesser angle relative to the pin axis than the pre-energizer surface, and the secondary centering surfaces are substantially flat planar surfaces.

7. The synchronizer mechanism of claim 1, further including:

means securing the first jaw means against rotation relative to the shaft;

means securing the flange against axial movement relative to the first jaw means and allowing circumferential movement of the flange relative to the axially movable jaw cluth means; and means limiting circumferential movement of the flange relative to the shaft and reacting the synchronizing torque between the flange and shaft, the means limiting including at least first and second ramp surfaces engagable in response to the synchronizing torque in one direction for producing an axial additive force ($F_a$) on the flange in the direction of the shift force ($F_o$) for increasing the force engaging the friction means associated with the first gear.

8. The synchronizer mechanism of claim 7, wherein the means limiting includes third and fourth ramp surfaces engagable in response to synchronizing torque of the gear in a direction opposite the one direction for producing another additive force ($F_a$) on the flange in the direction of the shift force ($F_o$) for increasing the force engaging the friction means.

9. A pin-type synchronizer mechanism for first and second axially spaced apart ratio gears secured against axial movement on a shaft having an axis about which the gears and shaft rotate relative to each other, the mechanism comprising:

first and second jaw and friction clutch members respectively affixed to the first and second gears, and a clutching assembly disposed between the gears and concentric to the shaft, the assembly including:

jaw clutch means secured for rotation with the shaft and axially movable into engagement with the first jaw clutch member in response to a shift force ($F_o$) moving a radially extending flange axially from a neutral position in one direction toward the first gear and the jaw clutch means axially movable into engagement with the second jaw clutch member in response to the shift force ($F_o$) moving of the flange from the neutral position in a direction opposite the one direction toward the second gear;

first and second friction rings rigidly connected together in axially spaced relation by a plurality of pins extending through circumferentially spaced openings in the flange, each pin having a reduced diameter portion for allowing limited relative rotation between the flange and pin, and axially spaced apart ends of each reduced diameter portion having blocker shoulder surfaces engagable with blocker shoulder surfaces defined about each flange opening;

pre-energizer means for resiliently moving the first and second friction rings into frictional engagement respectively with the first and second friction members in response to initial axial movement of the flange towards the first and second gears, respectively, the frictional engagement for effecting the limited relative rotation and engagement of the blocker shoulder surfaces to prevent a synchronous engagement of the jaw clutch means and to transmit the shift force ($F_o$) via the blocker shoulder surfaces to the frictionally engaged ring; characterized by:

the flange including an elongated slot associated with each flange opening, each slot having a transverse extent extending axially through axially facing end faces of the flange and an elongated extent with one end of the elongated extent extending into the associated flange openings and the other end being a reaction surface;

resilient means disposed in each slot with one end reacting against the reaction surface and another end reacting against a plunger;

each plunger having a head portion received by the reduced diameter portion of the pin disposed in the associated opeing with the flange in the neutral position, each plunger having axially spaced sidewalls slidably embracing the end faces of the flange for retaining the plunger relative to the axial direction of the flange.

10. The synchronizer mechanism of claim 9, wherein:

each pin includes an axis parallel to the shaft axis, the blocker shoulders surfaces defined by the axially spaced ends of the reduced diameter portion extending radially outward and axially away from each other at predetermined angles relative to the pin axis, each pin also including pre-energizer surfaces axially spaced apart by the reduced diameter portion for embracing surfaces on the plunger head portion, the pre-energizer surfaces extending radially outward and axially from each other at lesser angles relative to the pin axis than the blocker should surface angles.

11. The synchronizer mechanism of claim 10, wherein:
each pin includes a secondary centering surface extending radially outward and axially away from a radially outer edge of each pre-energizer surface and at lesser angles relative to the pin axis than the pre-energizer surfaces.

12. The synchronizer mechanism of claim 10, wherein:
the blocker shoulder surfaces are substantially conical surfaces and the pre-energizer surfaces are substantially flat planar surfaces.

13. The synchronizer mechanism of claim 12, wherein:
the flat planar surface extends chordally across a portion of each conical surface.

14. The synchronizer mechanism of claim 13, wherein:
each pin includes a secondary centering surface extending radially outward and axially away from a radially outer edge of each pre-energizer surface and at lesser angles relative to the pin axis than the pre-energizer surfaces, and the secondary centering surfaces are substantially flat planar surfaces.

15. The synchronizer mechanism of claim 9, further including:
means securing the flange against axial movement relative to the axially movable jaw clutch means and allowing circumferential movement of the flange relative to the axially movable jaw clutch means; and means limiting circumferential movement of the flange relative to the shaft and reacting to the synchronizing torque between the flange and shaft, the means limiting including at least first and second ramp surfaces engagable in response to synchronizing torque of at least the first gear and in at least one direction for producing an axial additive force ($F_a$) on the flange in the direction of the shift force ($F_o$) for increasing the force engaging the friction means associated with the first gear.

16. The synchronizer mechanism of claim 15, wherein the means limiting including third and fourth ramp surfaces engagable in response to synchronizing torque of the second gear in the one direction for producing another additive force ($F_a$) on the flange in the direction of the shift force ($F_o$) for increasing the force engaging the friction means associated with the second gear.

* * * * *